(12) United States Patent
Fiske (10) Patent No.: US 8,244,685 B2
(45) Date of Patent: Aug. 14, 2012

(54) DATA RESTORATION UTILIZING FORWARD AND BACKWARD DELTAS

(75) Inventor: Robert Stewart Fiske, Hopedale, MA (US)

(73) Assignee: Autonomy, Inc., San Francisco, CA (US)

( * ) Notice: Subject to any disclaimer, the term of this patent is extended or adjusted under 35 U.S.C. 154(b) by 0 days.

(21) Appl. No.: 12/711,413

(22) Filed: Feb. 24, 2010

(65) Prior Publication Data

US 2011/0208755 A1 Aug. 25, 2011

(51) Int. Cl.
*G06F 7/00* (2006.01)
(52) U.S. Cl. ........ 707/663; 707/667; 707/683; 707/684; 711/161; 714/6.2
(58) Field of Classification Search .......................... None
See application file for complete search history.

(56) References Cited

U.S. PATENT DOCUMENTS

| | | | | |
|---|---|---|---|---|
| 7,587,431 | B1 * | 9/2009 | Rao et al. ............................. | 1/1 |
| 2003/0135704 | A1 | 7/2003 | Martin | |
| 2004/0139128 | A1 | 7/2004 | Becker et al. | |
| 2007/0069570 | A1 * | 3/2007 | Hutchison et al. .............. | 299/55 |
| 2007/0282921 | A1 | 12/2007 | Atluri et al. | |
| 2009/0112948 | A1 * | 4/2009 | Nguyen et al. ................ | 707/204 |
| 2011/0106768 | A1 * | 5/2011 | Khanzode et al. ............ | 707/646 |

FOREIGN PATENT DOCUMENTS

EP 1522926 A2 4/2005

OTHER PUBLICATIONS

"The extended European Search Report on European Application No. 11155737.7", European Patent Office, dated Jun. 10, 2011.

* cited by examiner

*Primary Examiner* — Vei-Chung Liang (57) ABSTRACT

A restoration technique includes storing a collection of blocks having (i) a first baseline of blocks defining a file at a first time within a predefined window, (ii) older blocks, and (iii) newer blocks. The technique further includes providing a direction signal to restore the file at a particular time from the collection of blocks. The direction signal has an older direction value when the particular time is older than the first time and (ii) a newer direction value when the particular time is newer than the first time. The technique further includes forming, from the collection of blocks, a second baseline of blocks from the first baseline of blocks and additional blocks. The additional blocks are either (i) the older blocks or (ii) the newer blocks depending on the direction value. The second baseline defines the file at the particular time.

19 Claims, 8 Drawing Sheets

DATA RESTORATION UTILIZING FORWARD AND BACKWARD DELTAS

BACKGROUND

Most conventional computer systems rely on backup utilities to create and store backup copies of original data (e.g., files, tables, databases, raw data, etc.). A full backup is a complete copy of the original data. An incremental or differential backup is a copy of only the portions of the original data that have changed since the latest full backup.

A set of disk files at a common point in time is often referred to as a "policy". Additionally, a stored representation of the policy in its entirety at a single point in time is often referred to as a "baseline". Furthermore, a stored representation of changes (or deltas) to a policy as of a point in time is often referred to as a "version". A particular policy can be reconstituted from a baseline and, if necessary, one or more versions.

Some conventional online backup systems require a system administrator to define a retention period, i.e., a length of time that a backup copy of a policy is to be retained before it is permanently discarded. Such an online backup system stores a baseline of the policy at the onset of the retention period. Then, the conventional online backup system routinely stores versions of the policy as time passes (e.g., every 15 minutes). Additionally, the conventional online backup system routinely combines versions together (e.g., recent 15 minute versions into fewer daily versions, recent daily versions into fewer monthly versions, and so on).

At all times, the baseline contains the oldest data within the system and, eventually, the time difference between the present time and the baseline time reaches the retention period. At this point, the conventional online backup system combines the oldest version and the baseline to create a more-current baseline which remains within the retention period. That is, the conventional online backup system overwrites blocks of the baseline with newer blocks from the oldest version. During this process, the conventional online backup system discards the overwritten blocks of the baseline since these blocks contain data which is now older than the retention period, i.e., expired data. Additionally, once creation of the more-current baseline is complete, the conventional online backup system discards the oldest version since it is no longer needed, i.e., the data within the blocks of the oldest version now resides in the more-current baseline.

Over time, the conventional online backup system periodically repeats the above-described forward rotation of the baseline. That is, the online backup system combines the oldest version and the baseline to create a more-current baseline which remains just within the retention period. Since the overwritten blocks of the baseline now contain expired data and since the oldest version is no longer needed, the overwritten blocks of the baseline and the oldest version are continuously discarded during this baseline rotation process.

SUMMARY

Unfortunately, there are deficiencies with the above-described conventional online backup system which routinely combines the oldest version and the baseline to create a more-current baseline. For example, although it may be acceptable to provide relatively moderate (or even somewhat slow) performance when restoring a relatively old policy (e.g., to recover a file which has almost reached the end of the retention period), it is desirable to have relatively rapid restoration performance for relatively recent policies (e.g., to be able to quickly recover a file which has been recently created or modified). However, since the conventional online backup system maintains the baseline at the end of the retention period (i.e., at all times, the baseline contains the oldest data in the system), the conventional online backup system must rotate the baseline substantially forward, perhaps through most or even all of the versions in order to restore a recent policy. Accordingly, for restoration of relatively recent policies, (i) the demand for faster performance and (ii) the number of operations necessary for proper restoration tend to increase. Thus, to provide acceptable restoration performance of a recent policy, the baseline and all of the versions must be kept on online storage or high-end, near-line storage. Such equipment is often expensive and typically requires a large amount of power to operate and cool.

In contrast to the above-described conventional online backup system which routinely combines the oldest version and the baseline to create a more-current baseline, an improved backup system keeps a baseline which is nearer present time, and which stores versions which are older than the baseline as well as other versions which are newer than the baseline. The older versions enable recovery of policies which are older than the baseline. The newer versions enable recovery of policies which are newer than the baseline. As a result, fewer versions need to be combined with the baseline to restore a relatively recent policy thus providing faster restoration time, and consuming less power in the process. Additionally, policies which are older than the baseline are easily recoverable by combining the baseline with one or more older versions. Moreover, since restorations of older files typically do not require fast performance, the oldest versions can be located in storage which is relatively low cost and which requires significantly less power to operate (e.g., spun down low-end disk drives, CD-ROM, etc.).

One embodiment is directed to a restoration technique which includes storing a collection of blocks having (i) a first baseline of blocks defining a set of files at a first time within a predefined window, (ii) older blocks, and (iii) newer blocks. The technique further includes providing a direction signal to restore the set of files at a particular time from the collection of blocks. The direction signal has (i) an older direction value when the particular time is older than the first time and (ii) a newer direction value when the particular time is newer than the first time. The technique further includes forming, from the collection of blocks, a second baseline of blocks from the first baseline of blocks and additional blocks. The additional blocks are either (i) the older blocks or (ii) the newer blocks depending on the direction value. The second baseline defines the set of files at the particular time.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Overview

Improved backup techniques involve keeping a baseline which is nearer present time than in conventional backup systems, and which stores versions (i.e., policy deltas) which are newer and older than the baseline. Accordingly, fewer versions need to be combined with the baseline to restore a relatively recent policy thus providing faster restoration time, and consuming less power in the process. Nevertheless, policies which are older than the baseline can be recovered simply by combining the baseline with saved versions which are older than the baseline. Furthermore, the oldest versions can be located in storage which is relatively low cost and which requires significantly less power and cooling to operate since fast performance is typically not demanded for restorations of older policies.

Figure 1:
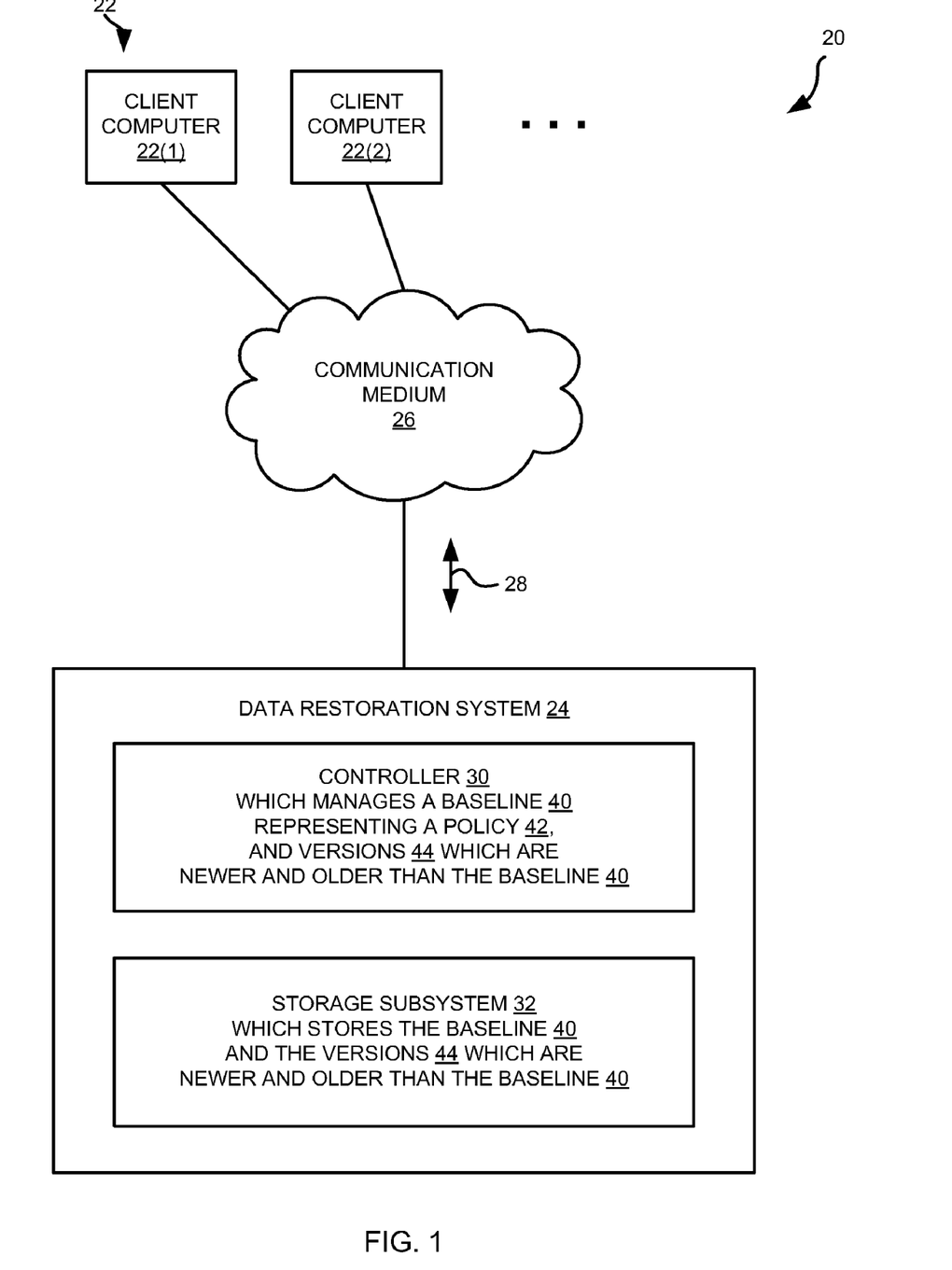
FIG. 1 is a block diagram of an electronic environment having a data restoration system which utilizes forward and backward deltas.

FIG. 1 shows an electronic environment 20 having a computerized backup system which utilizes forward and backward deltas to backup and recover policies (i.e., sets of disk files) over time. In particular, the electronic environment 20 includes a set of client computers 22(1), 22(2), . . . (collectively, client computers 22), a data restoration system 24, and a communications medium 26 which enables the client computers 22 to exchange electronic data signals 28 (e.g., commands, files, blocks of data, etc.) with the data restoration system 24.

The communications medium 26 may include a variety of different computer networking components for robust and reliable communications (e.g., cables, switches, routers, fiber optic devices, wireless devices, other network equipment, combinations thereof, etc.). Accordingly, the electronic data signals 28 may include packets, cells, frames, fiber optic signals, wireless signals, combinations thereof, etc. It should be understood that the communications medium 26 is illustrated as a network cloud since it is capable of having a variety of topologies (e.g., hub-and-spoke, ring, backbone, irregular, combinations thereof, etc.). Moreover, the communications medium 26 is capable of extending across one or more LANs, WANs, public networks, the Internet, and the like.

The data restoration system 24 includes a controller 30 and a storage subsystem 32. During operation, the controller 30 is constructed and arranged to manage a baseline 40 representing a policy 42, and versions 44 (i.e., groups of changed disk file blocks) some of which are newer and some of which are older than the baseline 40. The storage subsystem 32 stores the baseline 40 as well as the versions 44, i.e., a collection of blocks. As mentioned earlier, policies 42 which are newer than the baseline 40 can be recovered by combining the baseline 40 with one or more newer versions 44 (i.e., forward policy deltas) saved within the storage subsystem 32. Similarly, policies 42 which are older than the baseline 40 can be recovered by combining the baseline 40 with one or more older versions 44 (i.e., backwards policy deltas) saved within the storage subsystem 32. Further details will now be provided with reference to FIG. 2.

System Details

Figure 2:
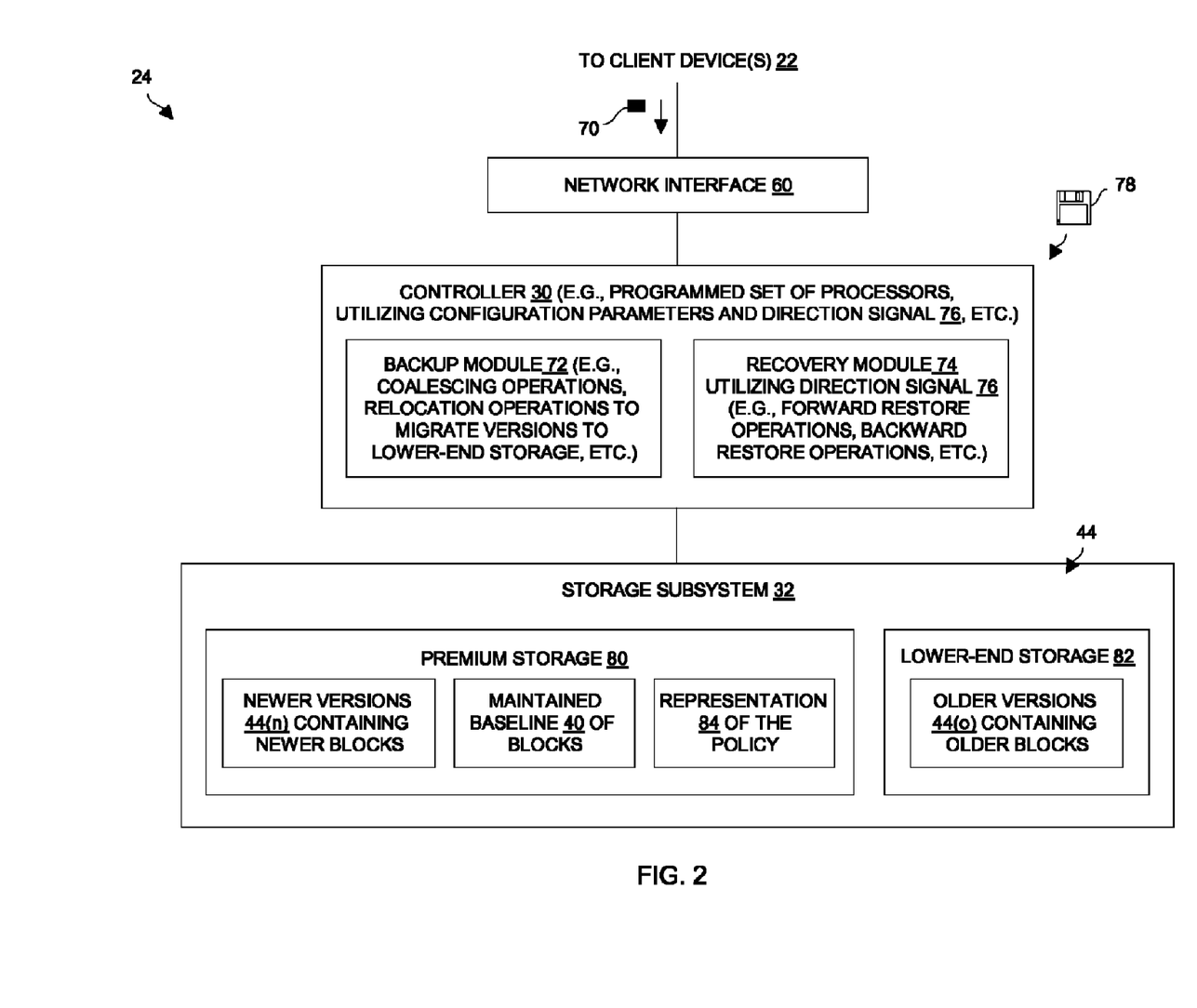
FIG. 2 is a block diagram showing particular details of the data restoration system of FIG. 1.

FIG. 2 shows various components of the data restoration system 24. As shown in FIG. 2, the data restoration system 24 includes a network interface 60 which enables the system 24 to connect to the communications medium 26 and thus communicate with the client devices 22 (also see FIG. 1). Along these lines, the controller 30 is able to receive and respond to backup and restoration commands 70 from the client devices 22 through the network interface 60 (also see the electronic data signals 28 in FIG. 1).

The controller 30 includes a backup module 72 and a recovery module 74. The backup module 72 collects the original baseline 40 and versions 44 from the client devices 22 through the network interface 60, and performs a variety of coalescing operations (also see FIG. 1). One type of coalescing operation involves combining versions 44 together to reduce the number of versions 44 stored within the storage subsystem 32. Another type of coalescing operation involves combining one or more versions with the baseline 40 to form another baseline 40 (e.g., when routinely creating a new baseline to comply with data retention rules, to recover an old policy, etc.). Additionally, the backup module 50 performs data relocation operations which involves transferring the older versions 44 from higher-performance locations to lower-performance locations within the storage subsystem 32.

The recovery module 74 responds to the commands 70 received by the network interface 60 to restore particular policies 42 gathered by the system 24 over time (also see FIG. 1). For example, a user may need to retrieve a particular disk file belonging to a particular policy from a particular time prior to its modification or deletion. In response to such commands 70, the recovery module 74 utilizes a direction signal 76 which identifies whether the baseline 40 is to be combined with one or more newer versions 44 (i.e., forward deltas) to restore a policy representation which is newer than the baseline 40, or one or more older versions 44 (i.e., backwards deltas) to restore a policy representation which is older than the baseline 40.

In some arrangements, the backup and recovery modules 72, 74 are implemented by a set of processors or other types of control/processing circuitry running software. In such arrangements, the software instructions can be delivered to the controller 30 in the form of a computer program product 78 (illustrated generally by a diskette icon 78 in FIG. 2) having a computer readable storage medium which stores the instructions in a non-volatile manner. Examples of suitable computer readable storage media include tangible articles of manufacture and apparatus such as CD-ROM, flash memory, disk memory, tape memory, and the like.

The storage subsystem 32 preferably includes premium storage 80 and lower-end storage 82. The premium storage 80 is superior to the lower-end storage 82 in the sense that the equipment which forms the premium storage 80 provides superior to data access times than that of the lower-end storage 82. However, the premium storage 80 may come at a higher cost due to one or more operating aspects (e.g., faster disk drives, higher power consumption, greater cooling requirements, etc.).

For instance, in some arrangements, the premium storage 80 and the lower-end storage 82 may include the same types of disk drives, but the drives of the premium storage 80 may be continuously spinning while the drives of the lower-end storage 82 may be normally spun down. In such arrangements, the premium storage 80 tends to require substantial power and constant cooling while the lower-end storage 82 requires power and cooling only when the disks are spinning. The premium storage 80 provides better access times since there is no waiting for disks to spin up.

In other arrangements, the premium storage 80 includes faster disks than the lower-end storage 82. The premium storage 80 provides better access times due to faster disk speeds. However, such faster disks are typically more expensive and require greater cooling resources.

In yet other arrangements, the premium storage 80 includes fast access memory (e.g., magnetic disks which are either constantly spinning or spun up as needed), and the lower-end storage 82 includes other types of media (e.g., slower magnetic tape storage, spun down CDs, near-line storage, far-line storage, etc.). Other arrangements and equipment combinations are suitable for use as well.

With various distinctions between the premium storage 80 and the lower-end storage 82 now having been explained, a description of which storage components of the storage subsystem 32 store particular types of data will now be provided. First, it should be understood that the client devices 22 have routine access to a set of disk files (e.g., one or more disk images, a directory of folders and files, a volume, etc.). This set of disk files (i.e., the policy 42) may reside locally on one or more of the client devices 22, may reside on a separate server, and/or in other remote locations which are accessible to the client devices 22.

As shown in FIG. 2, the premium storage 80 stores a baseline 40 and versions 44(n) which are newer than the baseline 40 (also see FIG. 1). The baseline 40 is a stored representation of a policy 42 in its entirety at a particular point in time (e.g., two months ago, six months ago, etc.). The newer versions 44(n) are changed portions of the policy 42 that were copied from the time of the baseline 40 to present time (i.e., changed disk file blocks).

Similarly, the lower-end storage 82 stores versions 44(o) which are older than the baseline 40. The older versions 44(o) are changed portions of the policy 42 that were saved from the baseline 40 when the baseline 40 is updated (i.e., rotated forward) to maintain the baseline 40 within the retention period. In some arrangements, the lower-end storage 82 may be spun down thus significantly reducing disk wear as well as power and cooling costs since rotations to restore old policy representations 84 may occur relatively infrequently.

Upon command from a user, the controller 30 may restore a particular representation 84 of the policy 42 from the baseline 40 and one or more versions 44(n), 44(o) (collectively, versions 44). For example, to restore a policy 42 which is newer than the baseline 40, the controller 30 combines the baseline 40 with one or more newer versions 44(n) stored in the premium storage 80. Additionally, to restore a policy 42 which is older than the baseline 40, the controller 30 combines the baseline 40 with one or more older versions 44(o) stored in the lower-end storage 82. Preferably, the premium storage 80 stores the policy representation 84 so that the user enjoys fast access to the policy representation 84 once the restoration process is complete. Further details will now be provided with reference to FIG. 3.

Figure 3:
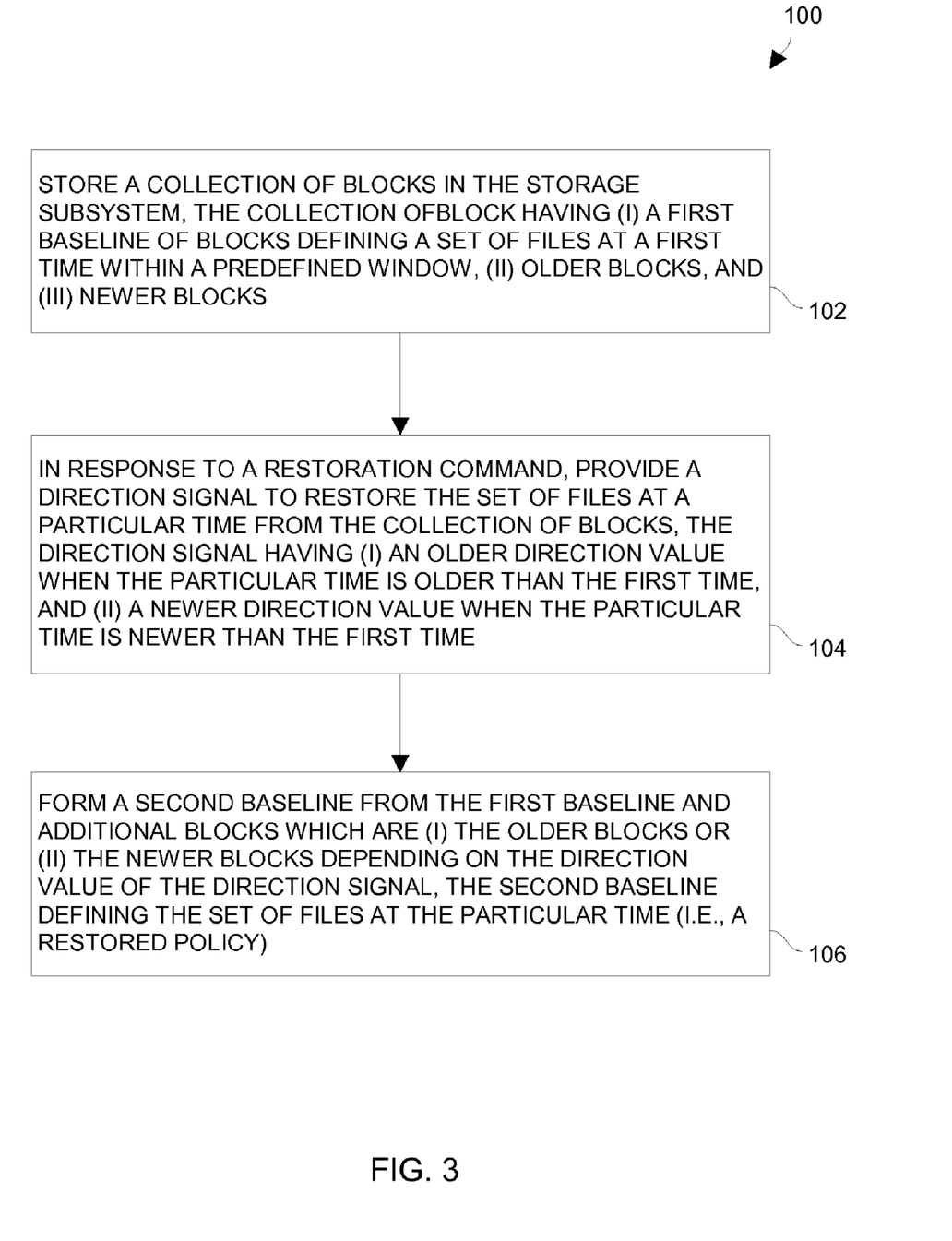
FIG. 3 is a flowchart of a storage procedure which is performed by the data restoration system of FIG. 1.

FIG. 3 shows a procedure 100 which is performed by the controller 30 of the data restoration system 24 when backing up and restoring the policy 42 (i.e., a set of disk files) from the client devices 22 (also see FIGS. 1 and 2). In step 102, the controller 30 stores a collection of blocks in the storage subsystem 32 (e.g., see the backup module 72 in FIG. 2), the collection of blocks being obtained from the client devices 22 over a predetermined window of time (i.e., a predefined retention period). The collection of blocks includes the baseline 40, as well as the older versions 44(o) and the newer versions 44(n) (FIG. 2). In some arrangements, the blocks have a size which matches the standard block size utilized by the client devices 22 (FIG. 1) for standard storage operations such as 8 KB, 16 KB, 32 KB, 64 KB, 256 KB, etc.

In step 104, in response to a restoration command 70 to recover a particular policy 42 representation, the controller 30 provides the direction signal 76 to restore the set of files at a particular time from the collection of blocks (e.g., see the recovery module 74 in FIG. 2). The direction signal 76 has (i) an older direction value when the particular time is older than the first time and (ii) a newer direction value when the particular time is newer than the first time. Depending on the direction value of the direction signal 76, the controller 30 combines either newer versions 44(n) with the baseline 40, or older versions 44(o) with the baseline to recover the policy 42.

In step 106, the controller 30 forms a representation 84 of the policy 42 (i.e., a second baseline of blocks, also see FIG. 2) from the first baseline 40 of blocks and additional blocks. The additional blocks are either (i) blocks of one or more of the older versions 44(o) or (ii) blocks of one or more of the newer versions 44(n) depending on the direction value of the direction signal 76. The recovered policy representation 84 defines the set of files at the particular time.

At this point, it should be understood that, since the baseline 40 is kept nearer to present time, there are less versions 44 to combine with the baseline 40 to reconstitute an image of one or more recent files vis-à-vis a conventional approach of maintaining the oldest blocks in the baseline. Accordingly, for the data restoration system 24, there is less disk I/O and the time for restore performance is reduced. Further details will now be provided with reference to FIGS. 4 through 8

Example

An example will now be provided to illustrate particular operating features of the data restoration system 24. Particular reference will be made to FIGS. 4 through 8 which show timing diagrams.

Suppose that the client devices 22 (FIG. 1) locally store a set of disk files over the course of time. During this time, the controller 30 of the data restoration system 24 saves blocks 120 which define the set of disk files at particular times, and manages the blocks 120 using associated index files 122 (step 102 in FIG. 3). In particular, each index file 122 includes a time field 124 and a set of entries 126. Each entry 126 includes an index field 128 and a block identifier field 130.

Figure 4:
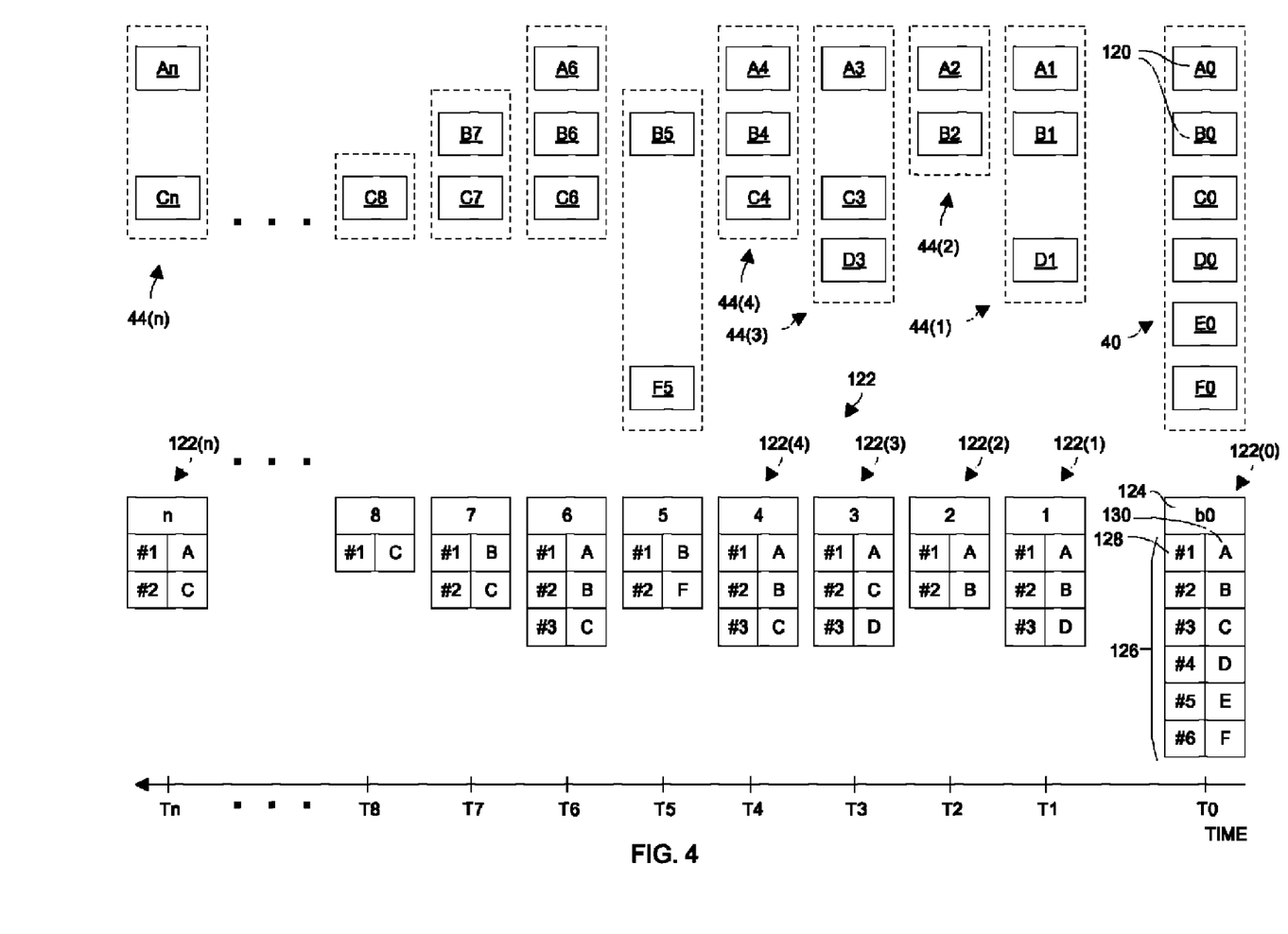
FIG. 4 is a timing diagram showing an example state of the data restoration system of FIG. 1 after a particular amount of time has passed.

At the onset of operation, the data restoration system 24 completely copies the set of disk files into the premium storage 80 (FIG. 2). In particular, at time T0, the controller 30 of the data restoration system 24 stores a baseline 40 containing blocks A0, B0, C0, D0, E0, and F0 (see FIG. 4) which define the set of files (the electronic data signals 28 in FIG. 1 illustrate this copying of data). Additionally, at time T0, the controller 30 creates an index file 122(0) which identifies the contents of the baseline 40. As illustrated in FIG. 4, the time field 124 of the index file 122(0) includes, as its contents, "b0" to indicate that the baseline 40 represents a policy 42 at time T0. Furthermore, the first entry 126 of the index file 122(0) indicates that the first block (i.e., block #1) of the baseline 40 contains block "A" of the set of files. Similarly, the second entry 126 of the index file 122(0) indicates that the second block (i.e., block #2) of the baseline 40 contains block "B" of the set of files, and so on.

The data restoration system 24 is constructed and arranged to periodically store versions 44 (i.e., policy deltas) as time passes. In particular, at time T1, the controller 30 saves any blocks of the set of files that changed since the baseline 40 was stored. By way of example, as of time T1 (e.g., 15 minutes after the baseline 40 was stored), blocks A0, B0 and D0 of the set of files have changed to blocks A1, B1 and D1. Accordingly, the controller 30 of the data restoration system 24 saves a new version 44(1), and an index file 122(1) representing the changes to the set of files.

In connection with index file 122(1), the time field 124 stores, as its contents, "1" to indicate that the version 44(1) represents changes to the set of files at time T1. Additionally, the set of entries 126 includes three entries indicating that the version 44(1) holds three blocks corresponding to blocks A, B, and D of the set of files, respectively. Since blocks C0, E0 and F0 did not change from time T0 to T1, the version 44(1) does not include blocks C, E and F.

It should be understood that the controller 30 stores the baseline 40 and the versions 44 which are newer than the baseline 40 in the premium storage 80 of the storage subsystem 32. Accordingly, the controller 30 enjoys relatively fast access to the baseline 40 and the newer versions 44.

Suppose that the process of capturing changes to the set of files continues over time. In particular, at time T2, the controller 30 saves version 44(2) and index file 122(2). Furthermore, the controller 30 saves version 44(3) and index file 122(3) at time T3, version 44(4) and index file 122(4) at time T4, and so on. In general, the process remains ongoing and the controller 30 saves version 44($n$) and index file 122($n$) at time Tn.

Figure 5:
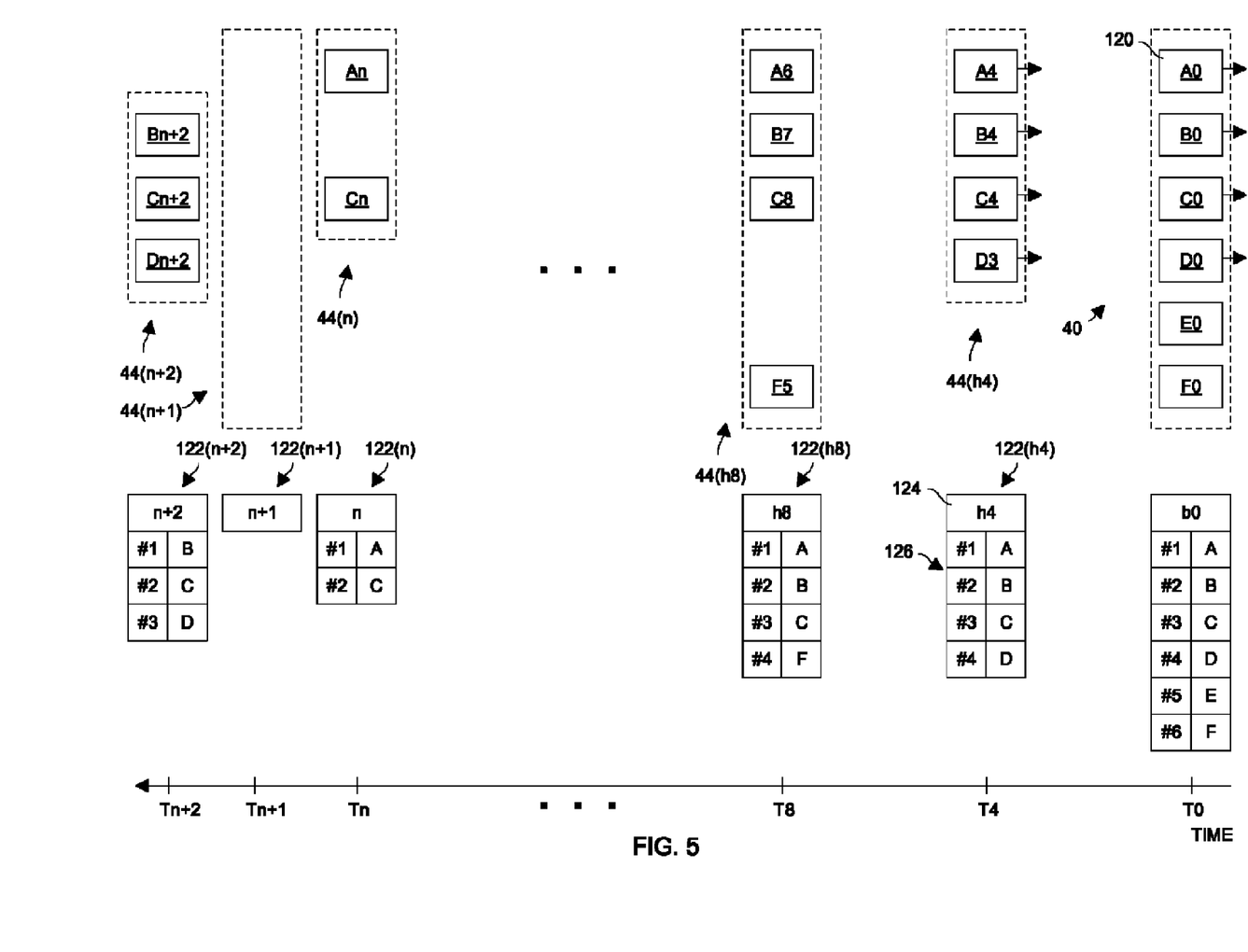
FIG. 5 is a timing diagram showing progress made to the example state of FIG. 4 after additional time has passed.

FIG. 5 shows that the data restoration system 24 is constructed and arranged to coalesce the versions 44 at set intervals (e.g., once an hour, once a day, once a month, etc.) in order to reduce the total number of versions 44 maintained by the system 24. For example, suppose that versions 44(1), 44(2), 44(3) and 44(4) represent disk file changes captured every 15 minutes. In this situation, the data restoration system 24 can coalesce these four adjacent versions 44(1), 44(2), 44(3) and 44(4) into a single version 44($h$4) and an index file 122($h$4) which represent the changes to the set of files over an hour from time T0 to time T4. Likewise, the data restoration system 24 can coalesce the next four versions 44 into another version 44($h$8) and an index file 122($h$8) which represent the changes to the set of files over another hour from time T4 to time T8, and so on.

It should be understood that the coalescing operations can occur concurrently with the saving of further versions 44 and index files 122. For example, while the controller 30 combines certain versions 44 together, the controller 30 continues to save new versions 44 from the client devices 22, e.g., new version 44($n$+1) and index file 122($n$+1) at time Tn+1, new version 44($n$+2) and index file 122($n$+2) at time Tn+2, and so on. Preferably, the system 24 performs the coalescing operations during periods of low activity, e.g., in the late evening or early morning.

It should be further understood that the controller 30 may encounter situations in which no changes have been made to the set of files. In such situations, the controller 30 still saves an index file 122. By way of example, there were no changes between time Tn and time Tn+1 so the index file 122($n$+1) does not include any entries 126 and thus represents a null version 44($n$+1).

Figure 6:
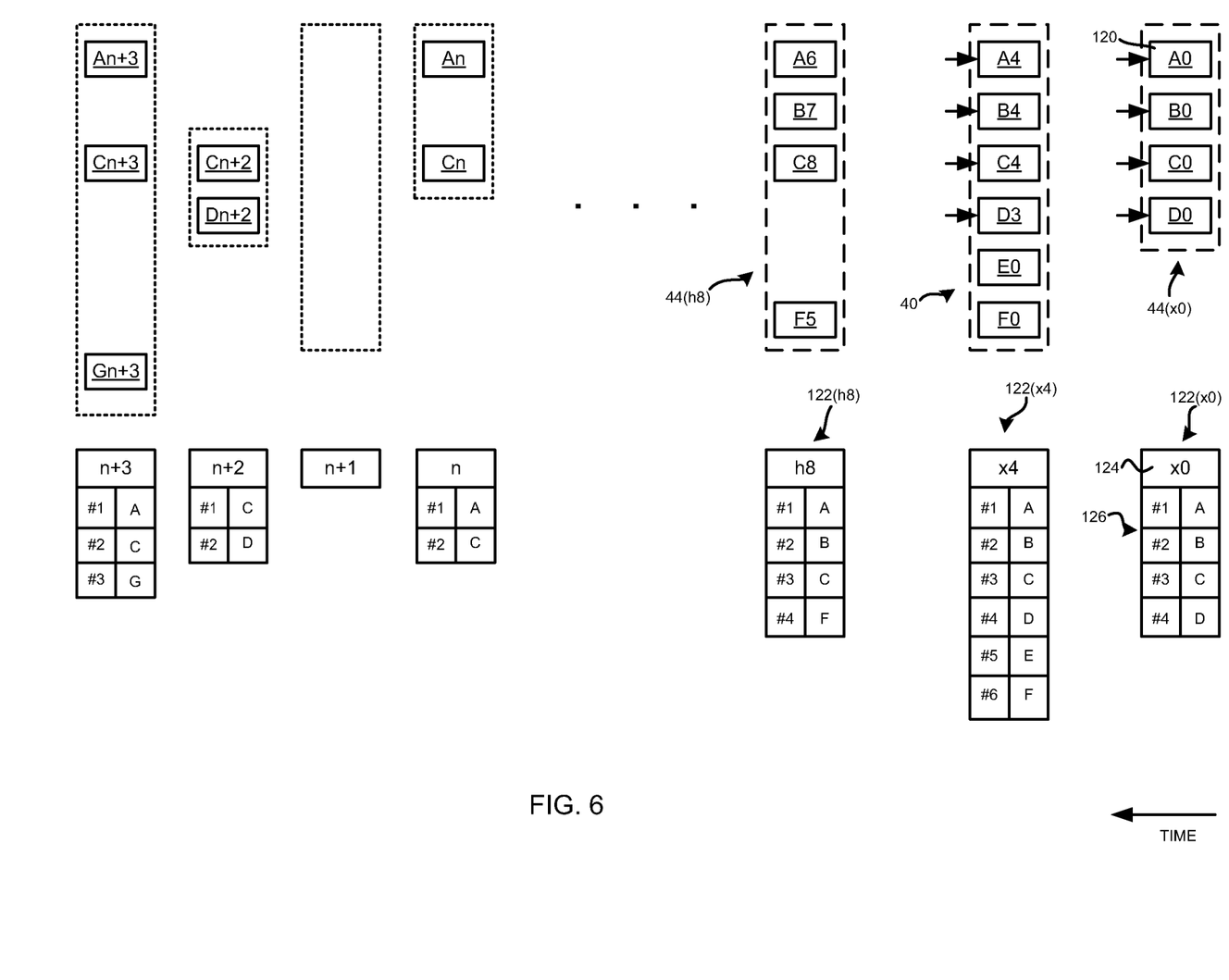
FIG. 6 is a timing diagram showing progress made to the example state of FIG. 5 after additional time has passed.

FIG. 6 shows that the data restoration system 24 is constructed and arranged to rotate the baseline 40 forward at set intervals (e.g., once a day, once a month, etc.) in order to keep the baseline 40 in proper pace relative to current time. In contrast to conventional system which maintain a baseline of blocks at the tail end of a retention period so that the baseline of blocks provides the oldest policy representation in the conventional system, the data restoration system 24 maintains the baseline 40 at a time which is nearer to the present time. For instance, although the entire retention period for the data restoration system 24 may be several years (e.g., four years, seven years, etc.), the baseline 40 is kept relatively current (e.g., two months old, six months old, etc.).

To maintain the pace of the baseline 40 with present time, the controller 30 routinely updates the baseline 40 (e.g., once a month, once a year, etc.). For instance, to update the baseline 40 from time T0 to time T4, the controller 30 reads the index file 122($h$4) (FIG. 5) which indicates that four blocks 120 of the baseline 40 (i.e., blocks A, B, C and D) have changed from time T0 to time T4.

To effectuate this update, the controller 30 copies blocks A0, B0, C0 and D0 from the baseline 40 into a version 44($x$0) and creates an index file 122($x$0) which indicates that the version 44($x$0) contains blocks A0, B0, C0 and D0 from the baseline 40. This operation is illustrated by the arrows pointing away from the baseline 40 in FIG. 5, and pointing toward the version 44($x$0) in FIG. 6. The index file 122($x$0) includes "x0" in the index field to indicate that the version 44($x$0) is a representation for a policy 42 at time T0, and entries 126 identifying which blocks of the baseline 40 have changed.

Then, still based on the index file 122($h$4), the controller 30 overwrites blocks A0, B0, C0 and D0 with blocks A4, B4, C4 and D3 from the version 44($h$4). This operation is illustrated by the arrows pointing away from the version 44($h$4) in FIG. 5, and pointing toward the baseline 40 in FIG. 6. At this time, the baseline 40 has been properly updated to represent a policy 42 at time T4. Additionally, rather than discard blocks A0, B0, C0 and D0 which have been removed from the baseline 40, the blocks A0, B0, C0 and D0 are maintained in the storage subsystem 32 for future access.

Preferably, the controller 30 transfers the blocks A0, B0, C0 and D0 from the premium storage 80 to the lower-end storage 82. In this optimized arrangement, the lower-end storage 82 may include magnetic disk drives which have been initially spun down to save power and cooling. When the controller 30 writes the blocks A0, B0, C0 and D0 to the drives, the drives spin up on demand and the blocks A0, B0, C0 and D0 are written to the drives. Eventually, the drives spin down automatically after some period of non-use.

In some arrangements, the time difference between present time and the time of the baseline 40 (i.e., a specified interval) is set by a configuration parameter within the controller 30. Although this configuration parameter may be predefined at system startup time, it is easy to change (e.g., tune) this configuration parameter at any time during system operation to obtain improved results. In particular, in response to such tuning, the baseline 40 is simply rotated further forward or backward so that the baseline 40 represents a policy 42 at the specified time interval from present time.

It should be understood that the above-described operation essentially maintains a single instantiation of the baseline 40 at all times. That is, the blocks 120 of the baseline 40 are simply overwritten with block changes in order to keep the baseline 40 in pace with current time.

An alternative way of keeping the baseline 40 updated with respect to current time, is to make a copy of the original baseline 40 and then update the copy of the original baseline 40. Once the copy of the original baseline 40 is completely updated, the original instantiation of the baseline 40 can then be deleted. This alternative may be advantageous since a baseline 40 is available to begin a restoration process at any time (rather than needing to wait for updating of the baseline 40 to complete).

It should be further understood that, at this point and as illustrated in FIG. 6, the baseline 40 now represents the policy 42 (i.e., the set of disk files backed up from the client devices 22) as of time T4. The above described operations of the system 24 can continue in an ever ongoing manner so that the baseline 40 continues to pace current time.

Figure 7:
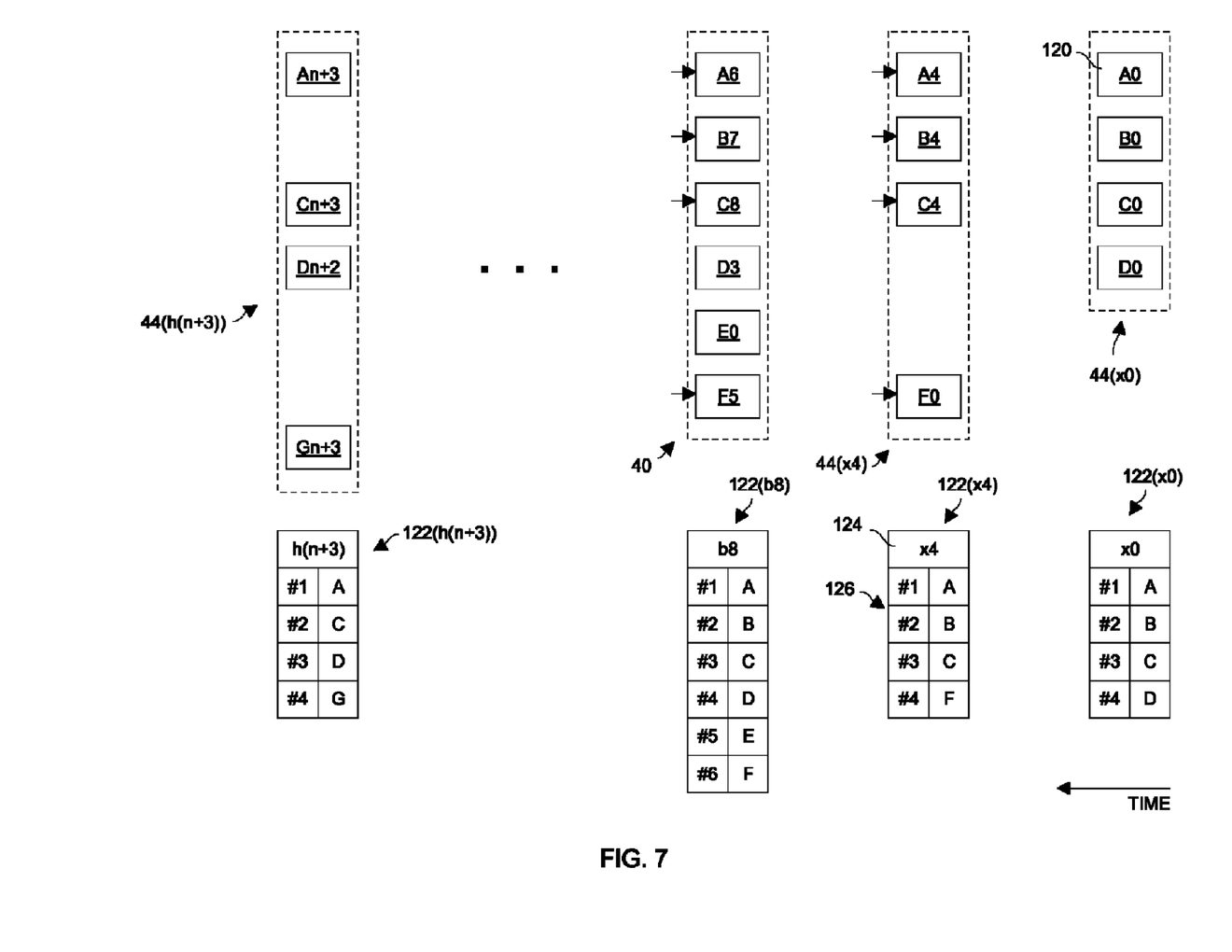
FIG. 7 is a timing diagram showing progress made to the example state of FIG. 6 after additional time has passed.

FIG. 7 shows that further progress made to the collection of blocks 120 of FIG. 6. In particular, at a new time after FIG. 6, the controller 30 rotates the baseline 40 forward by first copying blocks A4, B4, C4 and F0 from the baseline 40 into a version 44(x4) since the index file 122(h8) indicates that these blocks have changed from time T4 to T8 (also see FIG. 6). Additionally, the controller 30 creates index file 122(x4) indicating that the version 44(x4) includes blocks A, B, C and F from the baseline 40. The controller then overwrites blocks A4, B4, C4 and F0 of the baseline 40 with blocks A6, B7, C8 and F5 of the version 44(h8) (also see FIG. 6).

As further shown in FIG. 7, the controller 30 continues coalesces the versions 44(n), 44(n+1), 44(n+2), and 44(n+3) (see FIG. 6) into a new composite version 44(h(n+3)) and creates a new index file 122(h(n+3)) associated with the version 44(h(n+3)). Also, by way of example, FIGS. 6 and 7 show that the number of blocks which represent the policy 42 may grow over time as shown by the additional block labeled Gn+3 (e.g., perhaps due to adding a disk file to the set of disk files and/or increasing the size or one or more existing disk files of the set of disk files).

At this point, it should be understood that the controller 30 is capable of restoring the policy 42 for a time which is newer than the baseline 40 by coalescing the baseline 40 with one or more newer versions 44, and restoring the policy 42 for a time which is older than the baseline 40 by coalescing the baseline 40 with one or more older versions 44. Along these lines, updating of the baseline 40 as shown in FIGS. 4 through 7 illustrates how the baseline 40 is combined with newer versions 44, e.g., the baseline 40 at time T0 is combined with version 44(h4) to represent the policy 42 at time T4, and then further combined with version 44(h8) to represent the policy 42 at time T8.

Figure 8:
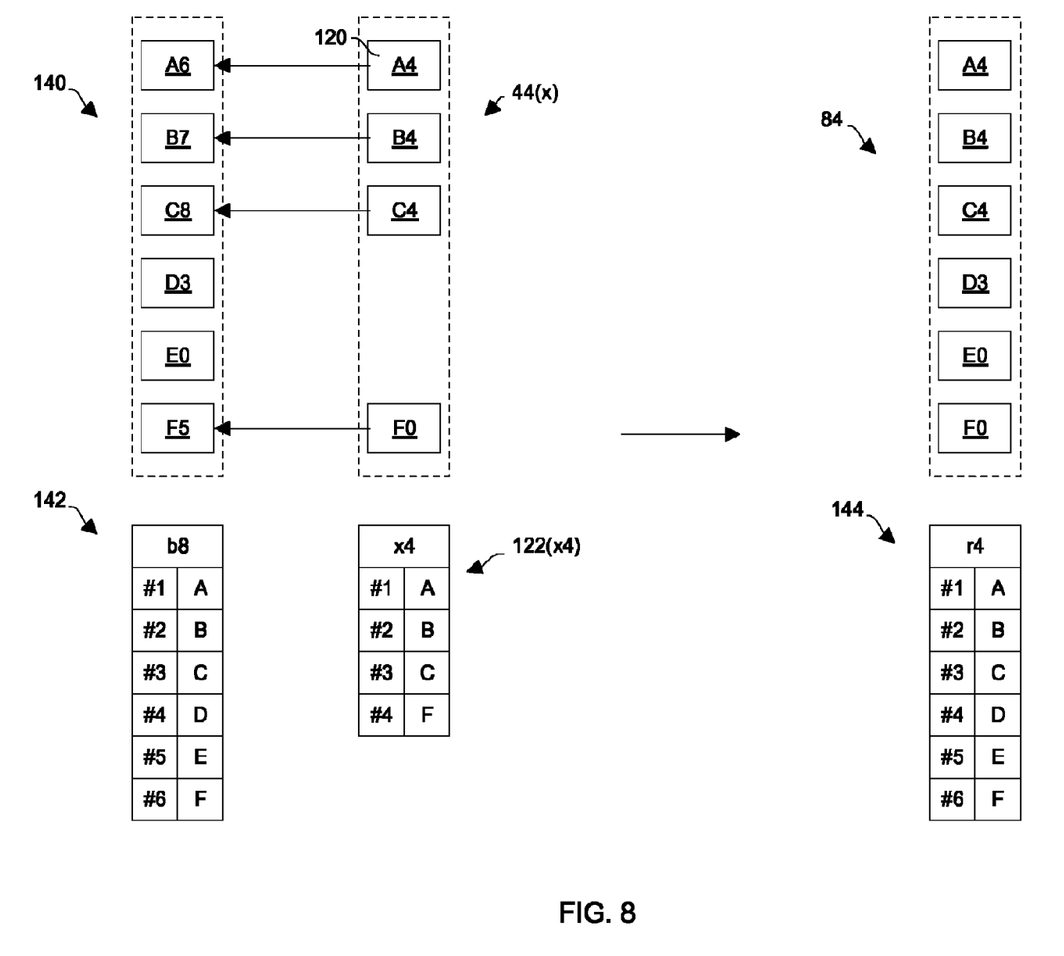
FIG. 8 is a timing diagram illustrating a reverse rotation process which is performed by the data restoration system to restore data in the example of FIGS. 4 through 7.

FIG. 8 shows how the baseline 40 is combined with an older version 44 to obtain the policy 42 at a time which is older than the baseline 40. Here, the controller 30 provides the policy 42 as represented at time T4 by first making a copy 140 of the baseline 40 and a copy 142 of the index file 122(b8) which identifies the copy 140 of the baseline 42 in the same manner that the index file 122(b8) identifies the actual baseline 40 (also see FIG. 7).

Next, the controller 30 reads the version 44(x4) and the index file 44(x4) which indicates that the version 44(x4) includes four blocks from the earlier form of the baseline 40, i.e., blocks A4, B4, C4 and F0. The controller 30 then overwrites blocks A, B, C and F of the copy 140 with these older blocks 120 thus forming a restored representation 84 of the policy 42 as of time T4. The controller further creates an index file 144 which identifies the particular blocks of the representation 84.

This process of rotating in the backwards direction is repeated by the controller 30 until the controller 30 generates the desired policy representation 84. Since the policy represented by the baseline 40 is relatively recent, there are fewer versions that must be combined with the baseline 40 to restore a recent file compared to a conventional system which maintains its baseline at the end of the retention period. Accordingly, with the system 24, there is typically less disk I/O resulting in faster restoration performance and consumption of less power and cooling. Preferably, the controller 30 locates this representation 84 in the premium storage 80 of the storage subsystem 32 for fast access (also see FIG. 2).

It should be understood that, as some versions 44 eventually age beyond the retention period, the system 24 is able to easily discard them. For example, if optical disk storage is employed for storing the oldest versions 44 (e.g., see the lower-end storage 82 in FIG. 2), the controller 30 simply destroys the optical disks containing the older versions on a routine basis (e.g., erases, overwrites, makes unreadable, etc.). As another example, if disk storage is employed for storing the oldest versions 44, the controller 30 simply deletes the versions 44 as when they exceed the retention period thus improving storage capacity.

Conclusion

As described above, an improved data restoration system 24 keeps a baseline 40 which is nearer present time, and which stores versions 44(o) which are older than the baseline 40 as well as other versions 44(n) which are newer than the baseline 40. The older versions 44(o) enable recovery of policy representations 84 which are older than the baseline 40. The newer versions 44(n) enable recovery of policy representations 84 which are newer than the baseline 40. Accordingly, fewer versions 44 need to be combined with the baseline 40 to restore a relatively recent policy thus providing faster restoration time, and consuming less power in the process. Furthermore, policy representations 84 which are older than the baseline 40 are easily recoverable by combining the baseline 40 with one or more older versions 44(o). Moreover, since restorations of older policy representations 84 typically do not require fast performance, the oldest versions 44(o) can be located in storage 82 which is relatively low cost and which requires significantly less power to operate (e.g., spun down low-end disk drives, CD-ROM, etc.).

While various embodiments of the invention have been particularly shown and described, it will be understood by those skilled in the art that various changes in form and details may be made therein without departing from the spirit and scope of the invention as defined by the appended claims.

What is claimed is:

1. A method of restoring a set of files from a collection of blocks, the set of files having existed at a particular time within a predefined time window, the method comprising:

storing the collection of blocks within a storage subsystem that includes (i) a premium storage area and (ii) a low-end storage area, wherein the premium storage area has a performance metric that is better than a performance metric of the low-end storage area, the collection of blocks defining the set of files at multiple different times within the predefined time window, the collection of blocks including (i) a first baseline of blocks which defines the set of files at a first baseline time within the predefined time window, (ii) older blocks which were formed before the first baseline time within the predefined time window, and (iii) newer blocks which were formed after the first baseline time within the predefined time window, wherein the first baseline of blocks and the newer blocks are initially stored in the premium storage area and wherein the older blocks are initially stored in the low-end storage area;

providing a direction signal in response to receipt of a restore command to restore the set of files at a particular time of the multiple different times within the predefined time window from the collection of blocks stored within the storage subsystem, the direction signal having (i) an older direction value indicating an older direction when the particular time is older than the first baseline time and (ii) a newer direction value indicating a newer direction when the particular time is newer than the first baseline time;

from the collection of blocks stored within the storage subsystem, forming a second baseline of blocks from the first baseline of blocks and additional blocks, the additional blocks being either (i) the older blocks or (ii) the newer blocks depending on whether the direction signal has the older direction value or the newer direction value, and the second baseline defining the set of files at the particular time;

replacing the first baseline of blocks with the second baseline of blocks in the premium storage area; and transferring the replaced first baseline of blocks to the low-end storage area.

2. A method as in claim 1, wherein storing the collection of blocks within the storage subsystem-further comprises:

saving, as the older blocks stored within the storage subsystem, blocks that changed between the first baseline and the next baseline to enable reformation of the first baseline from the next baseline and the blocks that changed between the first baseline and the next baseline.

3. A method as in claim 2, further comprising:

coalescing a first group of newer blocks stored at a first newer version time with a second group of newer blocks stored at a second newer version time to form a coalesced group of newer blocks to enable restoration of the set of files based on (i) the first baseline of blocks, (ii) the coalesced group of newer blocks and (iii) the direction signal.

4. A method as in claim 3 wherein forming the second baseline of blocks from the first baseline of blocks and the additional blocks includes generating the second baseline of blocks from (i) the first baseline, (ii) the coalesced group of newer blocks, and (iii) the direction signal.

5. A method as in claim 4 wherein generating the second baseline of blocks includes:

maintaining an index file which lists blocks of the first baseline which have been modified in the coalesced group of newer blocks, based on the index file, identifying and saving, as at least some of the older blocks, the blocks of the first baseline which have been modified in the coalesced group of newer blocks, and constructing a copy of the first baseline of blocks and replacing blocks of the copy of the first baseline with blocks of the coalesced group of newer blocks to form the second baseline of blocks.

6. A method as in claim 4 wherein generating the second baseline of blocks includes:

maintaining an index file which lists blocks of the first baseline which have been modified in the coalesced group of newer blocks, based on the index file, identifying and saving, as at least some of the older blocks, the blocks of the first baseline which have been modified in the coalesced group of newer blocks, and overwriting blocks of the first baseline with blocks of the coalesced group of newer blocks to form the second baseline of blocks.

7. A method as in claim 4, further comprising:

coalescing a first group of older blocks stored at a first older version time with a second group of older blocks stored at a second older version time to form a coalesced group of older blocks to enable restoration of the set of files based on (i) the first baseline of blocks, (ii) the coalesced group of older blocks and (iii) the direction signal.

8. A method as in claim 1, wherein the premium storage area comprises premium storage devices and the low-end storage area comprises low-end storage devices, and wherein transferring the first baseline of blocks to the low-end storage area further comprises:

spinning up the low-end storage devices, which are slower and less efficient than the premium storage devices, and writing the blocks that changed between the first baseline and the next baseline to the low-end storage devices and spinning down the low-end storage devices after writing is complete, the low end storage devices being routinely spun-down following a baseline transition.

9. A method as in claim 8, wherein the low-end storage area comprises an optical disk storage; and wherein the method further comprises:

routinely destroying optical disks containing older blocks once ages of the older blocks fall outside of a predefined time window.

10. A method as in claim 8, wherein the low-end storage area comprise a disk storage having an access time that is slower than that of the premium storage area; and wherein the method further comprises:

routinely erasing the older blocks having ages falling outside of a predefined time window.

11. A method as in claim 1 wherein the older direction value is different than the newer direction value;

wherein forming the second baseline of blocks from the first baseline of blocks and the additional blocks includes generating the second baseline of blocks from the first baseline and the older blocks when the direction signal has the older direction value; and wherein forming the second baseline of blocks from the first baseline and the additional blocks includes generating the second baseline of blocks from the first baseline and the newer blocks when the direction signal has the newer direction value.

12. A method as in claim 11 wherein the direction signal has the older direction value and not the newer direction value; and wherein generating the second baseline of blocks from the first baseline and the older blocks includes creating the second baseline of blocks from the first baseline, at least one older block, and no newer blocks.

13. A method as in claim 11 wherein the direction signal has the newer direction value and not the older direction value; and wherein generating the second baseline of blocks from the first baseline and the newer blocks includes creating the second baseline of blocks from the first baseline, at least one newer block, and no older blocks.

14. A data restoration system, comprising:

an interface;

a storage subsystem to store a collection of blocks, wherein the storage subsystem includes (i) a premium storage area and (ii) a low-end storage area, wherein the premium storage area has a performance metric that is better than a performance metric of the low-end storage area; and a control circuit coupled to the interface and to the storage subsystem, wherein the control circuit is to:

store a collection of blocks within the storage subsystem, the collection of blocks defining a set of files at multiple different times within a predefined time window, the collection of blocks including (i) a first baseline of blocks which defines the set of files at a first baseline time within the predefined time window, (ii) older blocks which were formed before the first baseline time within the predefined time window, and (iii) newer blocks which were formed after the first baseline time within the predefined time window, wherein the first baseline of blocks and the newer blocks are initially stored in the premium storage area and wherein the older blocks are initially stored in the low-end storage area;

provide a direction signal in response to receipt of a restore command through the interface to restore the set of files at a particular time of the multiple different times within the predefined time window from the collection of blocks stored within the storage subsystem, the direction signal having (i) an older direction value indicating an older direction when the particular time is older than the first baseline time and (ii) a newer direction value indicating a newer direction when the particular time is newer than the first baseline time;

from the collection of blocks stored within the storage subsystem, form a second baseline of blocks from the first baseline of blocks and additional blocks, the additional blocks being either (i) the older blocks or (ii) the newer blocks depending on whether the direction signal has the older direction value or the newer direction value, and the second baseline defining the set of files at the particular time;

replace the first baseline of blocks with the second baseline of blocks in the premium storage area; and transfer the replaced first baseline of blocks to the low-end storage area.

15. A data restoration system as in claim 14, wherein the control circuit, when storing the collection of blocks within the storage subsystem, is to:

save, as the older blocks stored within the storage subsystem, blocks that changed between the first baseline and the next baseline to enable reformation of the first baseline from the next baseline and the blocks that changed between the first baseline and the next baseline.

16. A data restoration system as in claim 14, wherein the older direction value is different than the newer direction value;

wherein the control circuit, when forming the second baseline of blocks from the first baseline of blocks and the additional blocks, is to generate the second baseline of blocks from the first baseline and the older blocks when the direction signal has the older direction value; and wherein the control circuit, when forming the second baseline of blocks from the first baseline and the additional blocks, is to generate the second baseline of blocks from the first baseline and the newer blocks when the direction signal has the newer direction value.

17. A non-transitory computer readable storage medium having a set of instructions stored thereon; the set of instructions, when executed by a computer, enabling the computer to restore a set of files from a collection of blocks, the set of files having existed at a particular time within a predefined time window, the set of instructions including:

instructions directing the computer to store the collection of blocks within a storage subsystem that includes (i) a premium storage area and (ii) a low-end storage area, wherein the premium storage area has a performance metric that is better than a performance metric of the low-end storage area, the collection of blocks defining the set of files at multiple different times within the predefined time window, the collection of blocks including (i) a first baseline of blocks which defines the set of files at a first baseline time within the predefined time window, (ii) older blocks which were formed before the first baseline time within the predefined time window, and (iii) newer blocks which were formed after the first baseline time within the predefined time window, wherein the first baseline of blocks and the newer blocks are initially stored in the premium storage area and wherein the older blocks are initially stored in the low-end storage area;

instructions directing the computer to provide a direction signal in response to receipt of a restore command to restore the set of files at a particular time of the multiple different times within the predefined time window from the collection of blocks stored within the storage subsystem, the direction signal having (i) an older direction value indicating an older direction when the particular time is older than the first baseline time and (ii) a newer direction value indicating a newer direction when the particular time is newer than the first baseline time;

instructions directing the computer to form, from the collection of blocks stored within the storage subsystem, a second baseline of blocks from the first baseline of blocks and additional blocks, the additional blocks being either (i) the older blocks or (ii) the newer blocks depending on whether the direction signal has the older direction value or the newer direction value, and the second baseline defining the set of files at the particular time;

instructions directing the computer to replace the first baseline of blocks with the second baseline of blocks in the premium storage area; and instructions directing the computer to transfer the replaced first baseline of blocks to the low-end storage area.

18. A non-transitory computer readable storage medium as in claim 17, wherein the instructions directing the computer to store the collection of blocks within the storage subsystem include:

instructions directing the computer to save, as the older blocks stored within the storage subsystem, blocks that changed between the first baseline and the next baseline to enable reformation of the first baseline from the next baseline and the blocks that changed between the first baseline and the next baseline.

19. A non-transitory computer readable storage medium as in claim 17, wherein the older direction value is different than the newer direction value;

wherein the instructions directing the computer to form the second baseline of blocks from the first baseline of blocks and the additional blocks include instructions directing the computer to generate the second baseline of blocks from the first baseline and the older blocks when the direction signal has the older direction value; and wherein the instructions directing the computer to form the second baseline of blocks from the first baseline and the additional blocks include instructions directing the computer to generate the second baseline of blocks from the first baseline and the newer blocks when the direction signal has the newer direction value.

* * * * *